United States Patent [19]

Pichon

[11] Patent Number: 4,738,430
[45] Date of Patent: Apr. 19, 1988

[54] SOLENOID VALVE CONTROL DEVICE

[75] Inventor: Jean-Michel Pichon, Messy, France

[73] Assignee: Bendix France S.A., Brancy, France

[21] Appl. No.: 915,459

[22] Filed: Oct. 6, 1986

[30] Foreign Application Priority Data

Oct. 9, 1985 [FR] France ............................. 85 14948

[51] Int. Cl.⁴ .............................................. F16K 31/06
[52] U.S. Cl. ........................... 251/129.15; 251/129.21;
251/366
[58] Field of Search ...................... 251/129.15, 129.21,
251/129.22, 366; 137/454.5

[56] References Cited

U.S. PATENT DOCUMENTS 3,377,046 4/1968 Frantz et al. .................... 251/129.21
3,814,132 6/1974 Greenwood et al. .......... 137/625.64
3,974,998 8/1976 Wood ......................... 251/129.15 X

FOREIGN PATENT DOCUMENTS 0120143 10/1984 European Pat. Off. .
3327683 2/1985 Fed. Rep. of Germany .

OTHER PUBLICATIONS

Machine Design, vol. 35, No. 2, Jan. 17, 1963, pp. 160–166—Solenoid Valves—J. E. Ellison.

Primary Examiner—Arnold Rosenthal
Attorney, Agent, or Firm—Larry J. Palguta; Ken C. Decker

[57] ABSTRACT

The solenoid valve body (3), which is firmly fixed to a transverse connection terminal block (4), comprises a through core (5, 6) whose ends (7, 8) project on each side of the body (3), the latter being positioned and held in an internal cavity (2) of a casing member (1) consisting of a single piece by an assembling member (16) which cooperates with one end (8) of the core and holds the other end (7) of the core so that it bears against an internal bearing surface (15) of the cavity (2), the terminal block (4) extending sealingly through an opening (9) of corresponding dimensions which is formed in a lateral wall (10) of the casing member (1).

7 Claims, 1 Drawing Sheet

U.S. Patent                    Apr. 19, 1988                    4,738,430
FIG_1
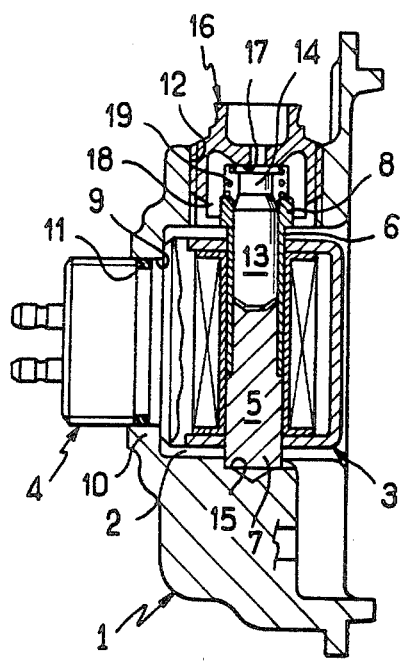
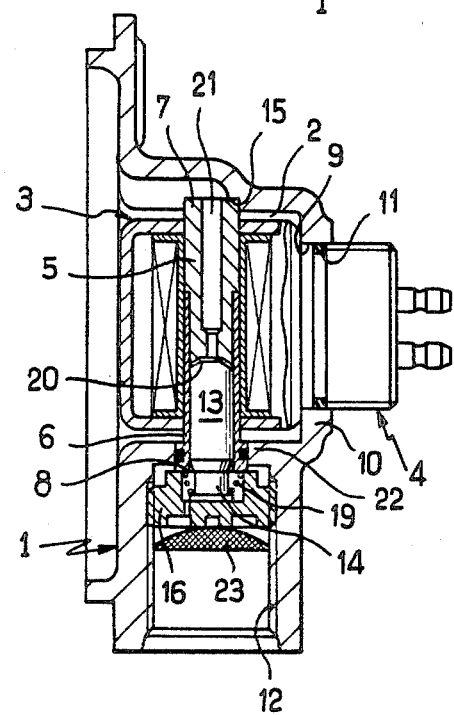
FIG_2

SOLENOID VALVE CONTROL DEVICE

The present invention relates to solenoid valve control devices, particularly for vehicle braking circuits, of the type comprising a casing which defines an internal cavity which forms part of a fluid path and which opens to the outside through an aperture, and a solenoid valve which is mounted within the casing and which comprises a solenoid valve body, which is firmly fixed to a transverse connection terminal block and is situated in the cavity of the casing with the terminal block projecting out of the casing through the aperture, a core extending through the solenoid valve body and having first and second ends projecting outwardly from each side of the body so as to position the latter in the cavity, the core comprising first and second portions which are coaxial, at least the second portion being tubular and forming said second projecting end, and a solenoid valve plunger forming a valve member, which is slidably mounted in the second core portion and which has one end which projects out of said second core end and which is biased by a valve spring.

A solenoid valve control device of this type is shown in the document DE-A-3,327,683. In known devices of this type, the solenoid valve body is positioned, with the interposition of seals, between two assembled casing members in an arrangement which requires accurate machining and assembly of the casing members, and also of the mounting surfaces of the solenoid valve body and of the internal constitutive components of the solenoid valve, without the possibility of compensating for the operational play and the variations of air gap in situ.

The object of the present invention is to provide a solenoid valve control device of the type mentioned above whose cost of manufacture and assembly is reduced, which makes it possible to be free of close tolerances and which is suitable for mass production with a small straying in the characteristics of the solenoid valve device.

To achieve this, according to a feature of the invention, the aperture through which the transverse terminal block passes is formed in a wall of a one-piece casing member which partially defines the cavity, the device comprising an assembling member which is mounted within the casing member and which cooperates in engagement with the second projecting core end so as to immobilize the latter in the casing member.

According to a more particular feature of the invention, a bearing surface is provided in the cavity with which the first core end, formed by the first core portion, co-operates in abutment under the effect of the engagement of the assembling member with the second core end, formed by the second core portion.

According to yet another feature of the invention, the aperture has a cross-section which corresponds to the transverse cross-section of the terminal block, sealing between the cavity and the outside being ensured between the internal wall of the aperture and the external peripheral wall of the terminal block.

With such an arrangement, the solenoid valve is arranged in a one-piece casing member, thus eliminating fitting problems in the case of mounting by means of two assembled casing members, and the external surfaces of the solenoid valve body no longer have any functional features from the point of view of assembly and may therefore be made in a relatively inaccurate manner. In addition, the independent fixing of the core in the casing member allows operational play to be compensated thus minimizing the air gaps and the magnetic leakages.

Other features and advantages of the present invention will emerge from the following description of embodiments given on an illustrative but in no way limitative basis, the said description being provided in association with the accompanying drawings, in which:

FIG. 1 is a diagramatic view partially sectioned longitudinally of a first embodiment of a solenoid valve control device according to the invention; and FIG. 2 is a view partially sectioned longitudinally of a second embodiment of the solenoid valve control device according to the invention.

In the following description, identical or similar members in the two embodiments bear the same reference numbers.

FIG. 1 shows, by way of an illustrative example which is not limiting in any way, a solenoid valve control device in a modulating unit of an pneumatic braking circuit for heavy vehicles. The device according to the invention comprises a one-piece casing member, designated in a general way by the reference 1, which is intended to be attached to a main casing portion (not shown) and which defines an internal cavity 2 forming part of a fluid path in the modulating unit which is controlled by a solenoid valve comprising of a solenoid valve body 3 which encloses an armature and at least one winding connectable to an electrical control circuit (not shown) by a terminal block 4 which is firmly fixed to the solenoid valve body 3 and which extends perpendicularly and laterally relative to the general axis of the solenoid valve body 3. The solenoid valve comprises a core extending coaxially through the solenoid valve body 3 and projecting outwards axially on each of the latter. The core consists of a coaxial assembly of a first core portion 5 and a second tubular core portion 6. The first core portion 5 thus forms a first projecting core end 7 whose shape is cylindrical and which has an end surface which is typically flat, the second core portion 6 forming a second tubular core end 8 of enlarged outer diameter. The internal cavity 2 opens towards the outside of the casing member by means of an aperture 9 which is formed in a lateral wall 10 of the casing member 1 and which has a cross-section which corresponds to the transverse cross-section of the terminal block 4, which thus passes through the aperture 9 while being guided and centered, a seal 11, which is advantageously carried on the terminal block 4, providing sealing between the internal cavity 2 and the outside of the casing member 1. The internal cavity 2 also communicates with the outside of the casing member 1 via an opening 12, which is typically a tapped hole and which is coaxial with the core 5,6 in the final mounting configuration of the solenoid valve. The solenoid valve comprises a solenoid valve plunger 13 which is slidably received in the second core portion 6 and whose outer end 14 extends outside the end 8 of the second core portion 6 in the opening 12.

In accordance with the invention, the internal cavity 2 comprises an internal bearing surface 15 which is perpendicular to the axis of the core 5,6 and which is typically formed by a portion of the inner wall of the cavity 2, with which the projecting end 7 of the first core portion 5 comes to cooperate in abutment under the effect of an axial bias which is exerted on the projecting end 8 of the second core portion 6 by an assembling member 16 which is mounted in the opening 12 and which cooperates in engagement with this end 8 of the second core portion 6, in an arrangement which thus locks the solenoid valve in position in the casing member 1.

The assembling member 16 typically has an external thread to enable it to be screwed into the tapped thread of the opening 12 and forms a member for connecting the cavity to an external fluid circuit (not shown) (in the embodiment shown in FIG. 1, a bleeding opening to free air for the cavity 2). In FIG. 1 the assembling member 16 defines centrally a valve seat 17 with which the outer end 14 of the solenoid valve plunger 13 cooperates selectively, the outer end 14 in this case forming a valve member, so as to control fluid flow communication between the external fluid circuit and the internal cavity 2. As shown in FIG. 1, the assembling member 16 comprises internal axial ribs 18 which cooperate in engagement with the projecting end 8 of the second core portion 6, thus providing a fluid passage between the valve seat 17 and the internal cavity 2, the outer end 14 which forms the valve member of the plunger 13 being biased towards the valve seat 17 by a spring 19 which bears against the end 8 of the second core portion 6 and which is coaxial with the projecting end 14 of the plunger 13. It will be understood that, as mentioned above, the fixing of the core 5,6 via independent screwing of the assembling member 16 allows operational play to be compensated and the air gaps to be minimized, the construction of the valve seat 17 on the assembling member 16 also allowing the air gap leakages to be reduced.

In the embodiment shown in FIG. 2, the first core portion 5 also has a hollow tubular configuration, and in this case its inner end 20 forms a valve seat which cooperates with the inner end of the plunger 13 which forms a valve member so as to control fluid flow communication between the internal passage 21 in the first core portion 5 and the opening 12, through passages formed longitudinally in the periphery of the plunger 13. In this embodiment, the projecting end 8 of the second core portion 6 is sealingly mounted in a coaxial bore in a wall 22 which is formed in the casing member between the internal cavity 2 and the opening 12 and projects axially outside this bore so as to cooperate with the inner end of the assembling member 16 which is screwed into the bottom of the opening 12 and which forms centrally a return stop for the end 14 of the plunger 13 under the effect of the return spring 19, the opening 12 being dimensioned so as to accept a connector for connecting to an external fluid circuit (not shown) and being advantageously provided with an internal filter 23.

Although the present invention has been described in relation to particular embodiments, it is not limited by them but, on the contrary, is capable of modifications and variants which will be apparent to a person skilled in the art.

What is claimed is:

1. A solenoid valve control device, comprising a casing defining an internal cavity which forms part of a fluid path and which opens externally through an aperture, a solenoid valve mounted within the casing and comprising a solenoid valve body fixed firmly to a transverse connection terminal block and situated in said cavity with said terminal block projecting out of said casing through said aperture, a core extending through said solenoid valve body and having first and second ends projecting outwardly from each side of said body so as to position the valve body in said cavity, said core having coaxial first and second core portions, at least said second core portion being tubular and forming said second end, and a solenoid valve plunger forming a valve member and mounted slidably in said second core portion, the valve plunger comprising one end which projects out of said second end and biased by a valve spring, characterized in that said aperture is formed in a wall of the casing which comprises a one-piece casing member defining partially said internal cavity, said device comprising an assembling member mounted within said casing member and cooperating in engagement with said second end so as to immobilize said core in the casing member, the assembling member mounted in an opening in said casing member, the opening coaxial with said core and communicating with the internal cavity, the opening forming a passage for connecting the fluid path with an external fluid circuit, the assembling member threadedly received in the opening and cooperating with the one end of the plunger, the assembly member adjustable relative to the casing member to effect the immobilization of the first and second core portions, and the plunger movable to control fluid along the fluid path.

2. The device according to claim 1, characterized in that the device comprises, in said cavity, a bearing surface with which the first end, formed by the first core portion, cooperates in abutment.

3. The device according to claim 2, characterized in that the aperture has a cross-section which corresponds to a transverse cross-section of said terminal block.

4. The device according to claim 2, characterized in that the bearing surface is formed by a portion of the casing member and which is at a right angle to a longitudinal axis of the core.

5. The device according to claim 1, characterized in that the valve spring is situated between said second end and the one end of said plunger.

6. The device according to claim 1, characterized in that the first core portion is tubular and comprises an inner end which forms a valve seat that cooperates with an adjacent valve member end of said plunger.

7. The device according to claim 6, characterized in that the first core portion includes an internal passage communicating with the valve seat formed by the inner end.

* * * * *